(12) United States Patent
Wells

(10) Patent No.: US 10,584,948 B2
(45) Date of Patent: Mar. 10, 2020

(54) AERODYNAMIC ARROW WITH CAMERA

(71) Applicant: Timothy Mark Wells, Canton, IL (US)

(72) Inventor: Timothy Mark Wells, Canton, IL (US)

( * ) Notice: Subject to any disclaimer, the term of this patent is extended or adjusted under 35 U.S.C. 154(b) by 0 days.

(21) Appl. No.: 15/881,571

(22) Filed: Jan. 26, 2018

(65) Prior Publication Data
US 2019/0234721 A1 Aug. 1, 2019

(51) Int. Cl.
*F42B 6/04* (2006.01)
*F42B 12/38* (2006.01)
*H04N 5/225* (2006.01)
*F42B 6/08* (2006.01)

(52) U.S. Cl.
CPC .............. *F42B 12/382* (2013.01); *F42B 6/04* (2013.01); *F42B 6/08* (2013.01); *H04N 5/2252* (2013.01); *H04N 5/2253* (2013.01); *H04N 5/2257* (2013.01)

(58) Field of Classification Search
CPC ................. F42B 6/04; F42B 6/06; F42B 6/08
See application file for complete search history.

(56) References Cited

U.S. PATENT DOCUMENTS

| | | | | |
|---|---|---|---|---|
| 4,722,531 A * | 2/1988 | Schram | ..................... | F42B 6/02 403/343 |
| 5,294,131 A * | 3/1994 | Manske | ................ | F42B 12/362 181/141 |
| 6,390,642 B1 * | 5/2002 | Simonton | ............. | F21V 33/008 362/203 |
| 7,437,985 B2 * | 10/2008 | Gal | ....................... | F42B 12/362 102/502 |
| 8,221,273 B2 * | 7/2012 | Donahoe | .................. | F41B 5/14 473/578 |
| 8,279,183 B2 * | 10/2012 | Ladouceur | .............. | G06F 3/041 345/173 |
| 9,310,173 B2 * | 4/2016 | Bay | .......................... | F41G 1/35 |
| 9,843,704 B2 * | 12/2017 | Lyren | ................... | H04N 5/2252 |
| 2004/0196367 A1 * | 10/2004 | Raymond | ............. | F42B 12/365 348/144 |
| 2012/0196708 A1 * | 8/2012 | Maddox | .................... | F42B 6/04 473/570 |
| 2014/0256479 A1 * | 9/2014 | Bynum, Jr. | ............... | F42B 6/08 473/470 |

\* cited by examiner

*Primary Examiner* — John A Ricci
(74) *Attorney, Agent, or Firm* — Zachary Hiller

(57) ABSTRACT

The present invention discloses about an arrow comprising an elongated hollow body, an arrowhead detachably attached to one end of the elongated body, a nock detachably attached to opposite end of the elongated body; at least one storage device, at least one battery, and at least one ON/OFF switch, which are connected through a circuitry enclosed in the elongated hollow body; and at least one camera mounted on the arrow at a desired position in connection with the with the ON/OFF switch and the storage device, wherein the lens of the camera is protected by an aerodynamic housing. Further the arrow comprises a plurality of fletchings and counter balances attached to the elongated body of the arrow, thereby allowing the arrow to move in a steady and straight path preventing the spinning of the arrow to capture good quality video recording by the camera during the travel of the arrow and after impact as well.

11 Claims, 3 Drawing Sheets

AERODYNAMIC ARROW WITH CAMERA

FIELD OF THE INVENTION

The present invention relates generally to an arrow with a camera and more particularly it relates to the aerodynamic arrangement of an arrow with a camera to allow steady and high quality recording of videos and images.

BACKGROUND OF THE INVENTION

Use of arrows in hunting, sports, cinematography, and in several other fields are still popular and is continuously used for several years. But traditional ways of using arrows to simply hit a target is not enough, thus the video recording of hitting the target and recording the path of the arrow during its travel has many applications in the above fields is needed, further the ability to track the arrow in a simple and economical way is needed.

Numerous innovations have been provided in prior art that are adapted to the use of tracking arrows after being shot and the use of several projectile launching devices comprising a camera is known in the art. Even though these innovations may be suitable for the specific purposes to which they address, they are not suitable for the purposes of the present invention.

U.S. Patent Application No. 20,120,196,708 to Maddox discloses about an arrow tracking device comprising an arrow having a tip, a shaft and an end, further a tracker is embedded within the shaft of the arrow. A current position of the arrow device may be located and displayed by transmitting arrow information from the arrow to a computer or portable device having a processor.

U.S. Pat. No. 6,390,642 to Simonton discloses about an illuminated archery arrow comprising a lighting assembly carried interiorly of the rearward portion of the arrow shaft. When, the light source is switched on, the illumination is visible through the nock, permitting improved visual tracking and locating of the arrow after the arrow shot from a bow.

U.S. Pat. No. 8,221,273 to Donahoe discloses about an apparatus and method that provide a user with information concerning a flight of an arrow, wherein the apparatus includes a device configured to provide feedback to a user concerning the arrow shot from a bow, for example, the speed profile, the flight profile of the arrow. A processor is coupled to the device to control operation of other devices included in the electronic apparatus, for example, GPS receivers, illuminating devices, speakers, cameras, microphones, etc.

U.S. Patent Application No. 20,040,196,367 discloses about a method and apparatus for performing reconnaissance, intelligence-gathering, and surveillance over a zone comprising a projectile equipped with a camera, image transmitter circuit, and a receiver member for receiving the images transmitted.

U.S. Patent Application No. 20,140,256,479 to Bynum, Jr. discloses about a gaming system comprised of a projectile and a target. The projectile comprises a camera which can record audio, video, and/or combinations thereof during the flight of the projectile. Further, the projectile is equipped with GPS capability so that the location of the projectile can be determined.

U.S. Pat. No. 7,437,985 to Gal discloses about an arrow-shaped reconnaissance means, which is designed to be connected to the barrel of a weapon and launched by firing a round of ammunition from the weapon. The reconnaissance means is designed to penetrate and stick into a wall or other target and transmit video and additional data from its location, providing information gathered from an elevated position about the area around the target.

U.S. Pat. No. 9,310,173 to Bay discloses about an arrow sighting system includes a hollow arrow shaft having a front end and a rear end. A nock is disposed on the rear end of the arrow shaft. A light source is provided to the arrow and arranged to illuminate the nock. A microprocessor is coupled to the light source, a flight data sensor, and a battery.

It is apparent now that numerous innovations for capturing surrounding images and other parameter during the flight of a projectile have been developed in the prior art that are adequate for various purposes. Furthermore, even though these innovations may be suitable for the specific purposes to which they address, accordingly, they would not be suitable for the purposes of the present invention as heretofore described. Thus, a simple device such as an arrow comprising at least one camera to capture and record steady and high quality images and videos during the flight of the arrow, while an LED light allow to track the arrow after being shot is needed to encourage its application to several areas including, sports, hunting, surveillance, etc. without using a complicated and costly device.

SUMMARY OF THE INVENTION

The present invention discloses about an arrow comprising an elongated hollow body, an arrowhead detachably attached to one end of the elongated body, a nock detachably attached to opposite end of the elongated body; at least one storage device, at least one battery, and at least one ON/OFF switch, which are connected through a circuitry enclosed in the elongated hollow body; and at least one camera mounted on the arrow at a desired position in connection with the with the ON/OFF switch and the storage device, wherein the lens of the camera is protected by an aerodynamic housing. Further the arrow comprises a plurality of fletchings and counter balances attached to the elongated body of the arrow, thereby allowing the arrow to move in a steady and straight path preventing the spinning of the arrow to capture good quality video recording by the camera during the travel of the arrow and after impact as well.

In view of the foregoing, it is therefore an object of the present invention to provide an arrow with a camera to capture images and videos during travel of the arrow and after impact as well.

Another objective is to provide a storage device in connection with the camera to store the recorded images and videos.

Yet another objective is to provide an arrow having an elongated hollow bode having a cavity to enclose at least a portion of the camera, a storage device, and a battery.

Yet another objective is to provide an arrow that allows filming the path ahead or behind the camera, before the arrow is shot, as the arrow flies through the air, and after impact as well.

Yet another objective is to provide an arrow that comprises a plurality of fletchings and counter balances attached to the elongated body of the arrow, thereby allowing the arrow to move in a steady and straight path preventing the spinning of the arrow to capture good quality video recording by the camera during the travel of the arrow and after impact as well.

Yet another objective is to provide an arrow that provides an ON/OFF switch comprising an LED light that gets illuminated when the switch is pushed to ON position, thus the illumination provided by the LED light facilitate to track the arrow.

Yet another objective is to provide an aerodynamic break resistant glass housing to protect the lens of the camera.

Yet another objective is to provide an arrow that is easy to manufacture, less expensive, and easy to operate.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "side," "top," "perspective," "top perspective," and derivatives thereof shall relate to the invention as oriented in FIG. 1-3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
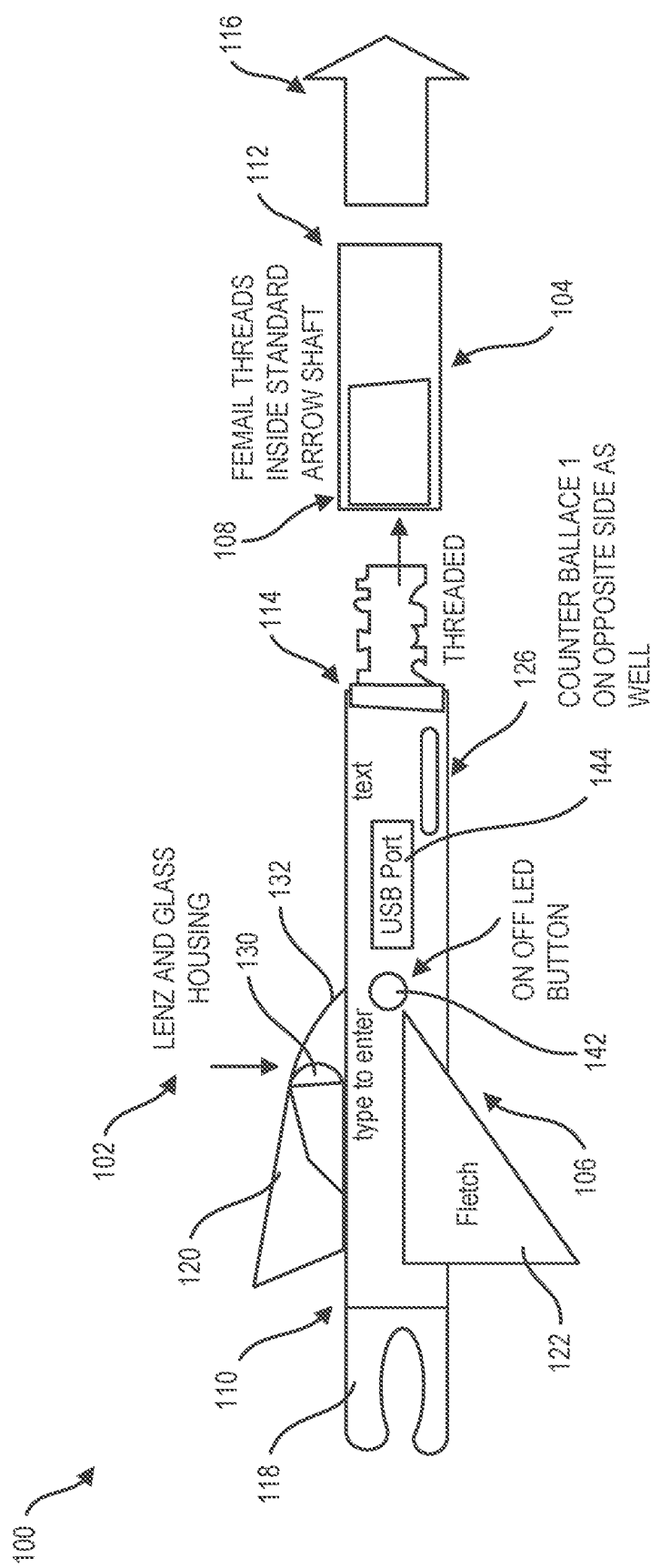
FIG. 1 illustrates a side view of an arrow, in accordance with an embodiment of the present invention.
Figure 2:
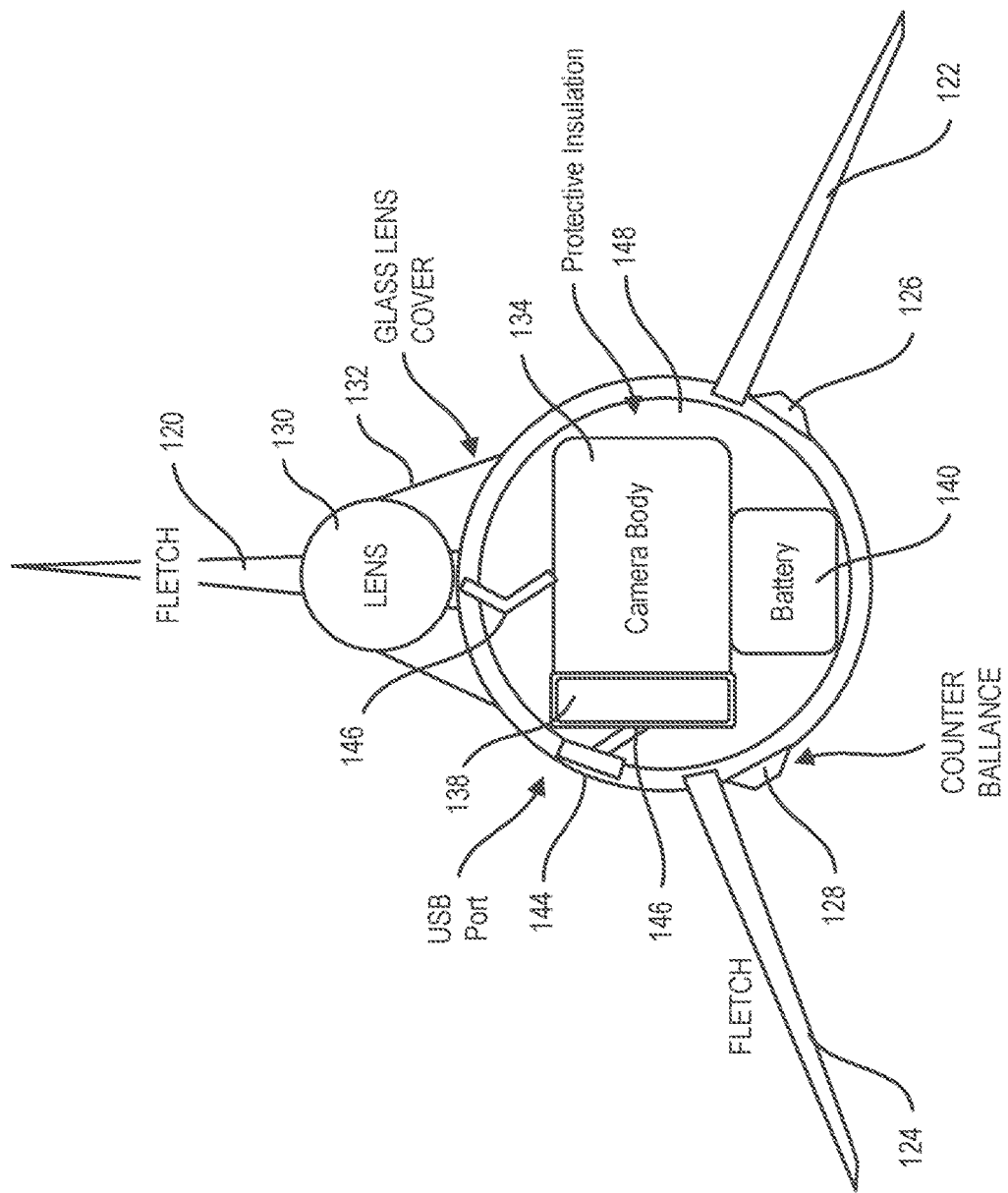
FIG. 2 illustrates cross sectional back view of a cavity of the arrow, in accordance with an embodiment of the present invention.
Figure 3:
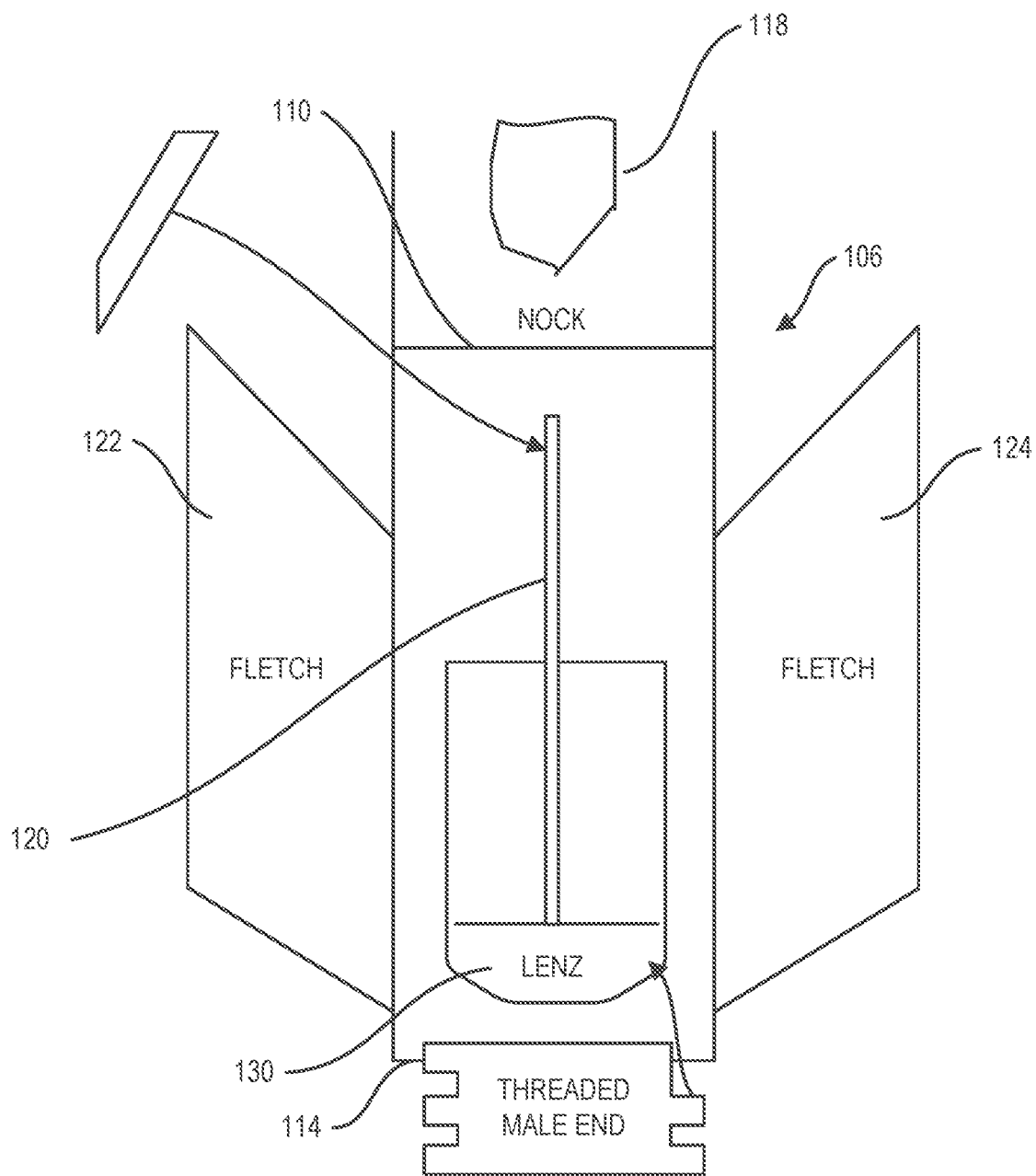
FIG. 3 illustrates a top view of the arrow showing aerodynamic configuration of the arrow, in accordance with an embodiment of the present invention.

The present invention discloses about an arrow is references in FIGS. 1 to 3. The arrow 100 comprising a camera 134 attached to its fletching 120, 122, 124, nock 118, arrowhead 116 or any portion of the arrow 100 or other items attached to the arrow 100. The body of the camera 134 which also contains a hard drive 138 and a battery 140 is enclosed inside the elongated body 102 of the arrow 100.

The camera 134 is attached to a lens 130, which extends outside of the arrow 100 and the lens 130 can be attached to either end 116, 118 of the arrow 100 to selectively capture images and videos of the front and back side of the arrow 100 during the flight of the arrow 100. The camera lens 130 is on the outside of the arrow 100 at any end or portion of the arrow 100 that allows to film the path ahead or behind the camera 134, before the arrow 100 is shot, as the arrow 100 flies through the air and after impact as well. Further, one or more cameras 134 can be attached to the arrow 100 to simultaneously record images and videos in one or more desired directions. The lens 130 is protected inside a clear protective glass housing 132 that slopes forward which makes it aerodynamic as well as break resistant when passing through an intended target or upon other impacts that could occur such as hitting a hard surface such as bone of an animal when shooting at an animal. The lens 130 is normally located at the base position of a fletching 120. Further two other straight fletchings 122, 124 are placed on the arrow 100, so as to maintain minimal spin of the arrow 100 in order to reduce a spinning video being captured. Further the arrow 100 has at least two counter balances 126, 128 positioned on either side of the arrow 100 to keep the arrow flight path straight and prevent it from diving or other diversions from a straight flight.

According to one aspect of the present invention an arrow 100 comprising an elongated body 102 having a cavity 136, an arrowhead 116 detachably attached to one end 112 of the elongated body 102, a nock 118 detachably attached to opposite end 110 of the elongated body 102; at least one storage device 138, at least one battery 140 and at least one ON/OFF switch 142, which are connected through a circuitry 146 enclosed in the cavity 136; and at least one camera 134 mounted on the arrow 100 at a desired position in connection with the with the ON/OFF switch 142 and the storage device 138, wherein lens 130 of the camera 134 is protected by an aerodynamic glass housing 132.

In another aspect, the elongated body 102 of the arrow 100 further comprising a front portion 104 and a back portion 106, wherein each of the front portion 104 and the back portion 106 has a first end 108, 110 and a second end 112, 114, the first end 108 of the front portion 104 is detachably attached to the second end 114 of the back portion 106.

In another aspect, the ON/OFF switch 142 comprises an LED, which gets illuminated when the switch 142 is pushed to ON position, thereby facilitating to track the arrow 100.

In another aspect, the aerodynamic glass housing 132 to protect the lens 130 of the camera 134 is made of break resistant glass.

In another aspect, at least one USB port 144 is in communication with the storage device 138 to download the stored recorded video and images to another storage device.

In another aspect, the at least one USB port 144 facilitate to recharge the battery 140 of the camera 134.

In another aspect, three fletchings 120, 122, 124 are detachably attached on the elongated body 102 of the arrow 100, whereby the fletchings 120, 122, 124 are aerodynamically positioned at desired angle with respect to each other, thereby preventing spinning of the arrow 100 during its travel for steady video recording by the camera 134.

In another aspect, at least one counter balance 126, 128 is detachably attached at a desired position on either side of the elongated body 102 of the arrow 100.

In another aspect, the camera 134 is positioned at the base of a fletching 120 and is at least covered by the aerodynamic glass housing 132.

In another aspect, the cavity 136 of the arrow 100 further comprises at least one protective insulation 148 on either side of the cavity 136 to protect the components from atmospheric moisture and short circuit.

In another aspect, an arrow 100 comprising an elongated body 102 having a front portion 104 and a back portion 106, wherein each of the front portion 104 and the back portion 106 has a first end 108, 110 and a second end 112, 114, the first end 108 of the front portion is detachably attached to the second end 114 of the back portion 106, further the back portion 106 comprises a cavity 136, whereby the cavity 136 is configured to enclose at least one storage device 138, at least a portion of a camera 134, at least one battery 140, at least a portion of one ON/OFF switch 142, at least one USB port 144 and a circuitry 146 to functionally connect each other, further the ON/OFF switch 142 comprises an LED, which gets illuminated when the switch 142 is pushed to ON position, thereby facilitating to track the arrow 100 after it is shot, further at least one lens 130 of the camera 134 is positioned on the elongated body 102 of the arrow 100 in a desired position and the lens 130 is protected by an aerodynamic and break resistant glass housing 132; an arrowhead 116, wherein the arrowhead 116 is detachably attached to the second end 112 of the front portion 104; a nock 118, wherein the nock 118 is detachably attached to the first end 110 of the back portion 106; a plurality of fletchings 120, 122, 124, wherein plurality of fletchings 120, 122, 124 are detachably attached on the back portion 106 of the elongated body 102 of the arrow 100; and at least one counter balance 126, 128, wherein the at least one counter balance 126, 128 is detachably attached to the front portion 104 of the elongated body 102 of the arrow 100.

In an embodiment of the arrow 100 of the present invention is reference in FIG. 1 showing side view of the device 100. The arrow 100 comprises having an elongated hollow body 102 comprising a front portion 104 and a back portion 106, wherein each of the front portion 104 and the back portion 106 has a first end 108, 110 and a second end 112, 114, the first end 108 of the front portion 104 is detachably attached to the second end 114 of the back portion 106. Further an arrowhead 116, wherein the arrowhead 116 is detachably attached to the second end 112 of the front portion 104. The arrow 100 further comprises a nock 118, wherein the nock 118 is detachably attached to the first end 110 of the back portion 106; a plurality of fletchings 120, 122, 124 wherein plurality of fletchings 120, 122, 124 are detachably attached on the back portion 106 of the elongated body 102 of the arrow 100, wherein the fletching 120, 122, 124 are aerodynamically positioned at desired angle with respect to each other, thereby preventing spinning of the arrow 100 during its travel. At least one counter balance 126, 128, wherein the at least one counter balance 126, 128 is detachably attached to the front portion 104 of the elongated body 102 of the arrow 100. The counter balances 126, 128 are positioned on either side of the front portion 104 of the arrow 100 to keep the arrow flight path straight and prevent it from diving or other diversions from a straight flight. The detachable attachment of the front portion 104, back portion 106, the arrowhead 116 and the nock 118, is provided by a threaded mechanism, a snap fit arrangement or any suitable arrangement known in the prior art.

Further as shown in FIG. 1, the arrow 100 is attached with a camera lens 130 to its fletching 124, however the camera lens 130 can be attached to the nock 118, arrowhead 116 or any portion of the arrow 100 or other items attached to the arrow 100. The lens 130 of the camera 134 is protected inside a clear, break resistant protective glass housing 132 that slopes forward making it aerodynamic. The break resistant protective glass housing 132 protects the camera lens 130 when passing through an intended target or upon other impacts that could occur such as hitting a hard surface like bone of an animal when shooting at an animal. The lens 130 can be attached to either end 116, 118 of the arrow 100 to selectively capture images and videos of the front and back side of the arrow 100 during the flight of the arrow 100. The camera lens 130 is on the outside of the arrow 100 at any end or portion of the arrow 100 that allows to film the path ahead or behind the camera 134, before the arrow 100 is shot, as the arrow 100 flies through the air and after impact as well. Further one or more cameras can also be attached to the arrow 100 to simultaneously record images and videos in one or more desired directions.

As shown in FIG. 2, the back sectional view of the back portion 106 of the arrow 100 illustrates a cavity 136, whereby the cavity 136 is configured to enclose at least one storage device 138, at least a portion of the camera 134, at least one battery 140, at least a portion of one ON/OFF switch (not shown), at least one USB port 144 and a circuitry 146 to functionally connect each other. Further one protective insulation 148 is provided on either side of the cavity 136 to protect the components from atmospheric moisture and short circuit. The FIG. 2 further shows the aerodynamic arrangement of the fletchings 120, 122, 124 and the break resistant protective glass housing 132.

The ON/OFF switch 142 and the at least one USB port 144 are mounted onto the elongated body 102 of the arrow 100 as shown in FIG. 1. The at least one USB port 144 is in communication with the storage device 138 to download the stored recorded video and images to another storage device, further the USB port 144 facilitate to recharge the battery 140 of the camera. The ON/OFF switch 142 further comprises an LED, which gets illuminated when the switch is pushed to ON position, thereby facilitating to track the arrow 100 after it is shot.

The FIG. 3 illustrates the lens 130 is normally located at the base position of a fletching 120. Further two other straight fletchings 122, 124 are placed on the arrow at a desired position and at a predetermined angle to the fletching 120, so as to provide aerodynamic configuration of the arrow 100 to preventing spinning of the arrow 100 during its travel for steady video recording by the camera, wherein the predetermined angle is 120 degrees. Further, FIG. 3 describes the threaded arrangement of the second end 114 of the back portion 106 of the elongated body 102, that can be detachably attached to the first end 108 of the front portion 104 of the elongated body 102.

It is desirable to use a high shutter speed and frame rates camera 134 to capture clear images and videos. Although any type of cameras can be used without departing from the scope and spirit of the present invention.

The arrow 100 of the present invention provides video proof of where the arrow 100 has hit. The arrow can be used in all types of arrow shooting demonstrations. Sports such as bow fishing, target shooting, general archery hunting, etc. For example TV shoots and movie making, like in mythological film making or action movies, etc. for example the camera 134 of arrow 100 can show Robin Hood's arrow's flight to his victim.

In an exemplary embodiment, the arrow 100 has an ON/OFF push switch with a lighted LED that has a simple function of turning the camera on or off by pressing the switch. Once turned on, the camera begins video recording automatically. The camera recording is then stopped and the camera is turned off with the press of the switch. Further, when the switch in ON position, the LED attached to the switch gets illuminated, thereby facilitating the tracking of the arrow after it is shot.

The recorded video and image data stored in the storage device 138 can be downloaded through an USB device or by a removable hard drive such as mini thumb drives. The USB port 144 is located on the elongated body 102 of the arrow 100 facilitating connection of the removable USB and other storage devices as well as recharging the camera battery 140.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An arrow comprising:
   an elongated body having a cavity, an arrowhead detachably attached to one end of the elongated body, a nock detachably attached to opposite end of the elongated body, a plurality of fletchings is detachably attached on the elongated body of the arrow wherein the plurality of fletchings are aerodynamically positioned at desired angle with respect to the elongated body;
   at least one storage device, at least one battery and at least one ON/OFF switch, which are connected through a circuitry are enclosed in the cavity; and
   at least one camera mounted on the arrow positioned at the base of a fletching in connection with the with the ON/OFF switch and the storage device, wherein lens of the camera is protected by an aerodynamic housing;
   the ON/OFF switch comprises an LED, which gets illuminated when the switch is pushed to ON position, thereby facilitating to track the arrow after it is shot.

2. According to the arrow of claim 1, wherein the elongated body further comprising a front portion and a back portion, wherein each of the front portion and the back portion has a first end and a second end, the first end of the front portion is detachably attached to the second end of the back portion.

3. According to the arrow of claim 1, wherein the aerodynamic housing to protect the lens of the camera is made of break resistant glass.

4. According to the arrow of claim 1, wherein at least one USB port positioned on the elongated body is in communication with the storage device to download the stored recorded video and images to another storage device and can also act as charging port.

5. According to the arrow of claim 4, wherein the at least one USB port facilitate to recharge the battery of the camera.

6. According to the arrow of claim 1, wherein three fletchings are detachably attached on the elongated body of the arrow, whereby the fletchings are aerodynamically positioned at desired angles with respect to each other, thereby preventing thee spinning of the arrow during its travel for steady video recording by the camera.

7. According to the arrow of claim 1, wherein at least one counter balance is detachably attached at a desired position on either side of the elongated body of the arrow.

8. According to the arrow of claim 1, wherein the cavity of the arrow further comprises at least one protective insulation on either side of the cavity to protect the components from external forces and elements.

9. An arrow comprising: an elongated body comprising a front portion and a back portion, wherein each of the front portion and the back portion has a first end and a second end, the first end of the front portion is detachably attached to the second end of the back portion, further the back portion comprises a cavity, whereby the cavity is configured to enclose at least one storage device, at least a portion of a camera, at least one battery, at least a portion of one ON/OFF switch, at least one USB port and a circuitry to functionally connect each other,
   further the ON/OFF switch comprises an LED, which gets illuminated when the switch is pushed to ON position, thereby facilitating to track the arrow after it is shot,
   further lens of the camera is positioned at the base of a fletching and the lens is protected by an aerodynamic and break resistant glass housing;
   an arrowhead, wherein the arrowhead is detachably attached to the second end of the front portion; a nock, wherein the arrowhead is detachably attached to the second end of the front portion; a plurality of fletchings, wherein the plurality of fletchings are detachably attached on the back portion of the elongated body of the arrow at desired angle with respect to each other thereby preventing spinning of arrow; and at least one counter balance, wherein the at least one counter balance is detachably attached to the front portion of the elongated body of the arrow.

10. According to the arrow of claim 9, wherein the plurality of fletchings comprises three fletchings that are detachably attached on the elongated body of the arrow, whereby the fletchings are aerodynamically positioned at desired angle with respect to each other, thereby preventing rotation of the arrow during its travel for steady video recording by the camera.

11. According to the arrow of claim 9, wherein the cavity of the arrow comprises at least one protective insulation on the either side of the cavity to protect the components from external forces and elements.

* * * * *